(12) United States Patent
Zarras et al.

(10) Patent No.: US 11,554,393 B1
(45) Date of Patent: Jan. 17, 2023

(54) ELECTROSTATICALLY-ASSISTED TWO-STEP CONDUCTIVE POLYMER APPLIQUE (CPA) PAINT REMOVAL PROCESS

(71) Applicant: The United States of America, as represented by the Secretary of the Navy, Arlington, VA (US)

(72) Inventors: Peter Zarras, Ridgecrest, CA (US); John D. Stenger-Smith, Ridgecrest, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 58 days.

(21) Appl. No.: 17/336,653

(22) Filed: Jun. 2, 2021

(51) Int. Cl.
| | | |
|---|---|---|
| *C09J 9/02* | (2006.01) |
| *B08B 7/00* | (2006.01) |
| *C09J 11/04* | (2006.01) |
| *C09J 133/02* | (2006.01) |
| *C09J 179/02* | (2006.01) |
| *C09J 165/00* | (2006.01) |
| *B08B 6/00* | (2006.01) |
| *B08B 7/04* | (2006.01) |
| *C09J 143/04* | (2006.01) |

(52) U.S. Cl.
CPC .............. *B08B 7/0028* (2013.01); *B08B 6/00* (2013.01); *B08B 7/04* (2013.01); *C09J 9/02* (2013.01); *C09J 11/04* (2013.01); *C09J 133/02* (2013.01); *C09J 143/04* (2013.01); *C09J 165/00* (2013.01); *C09J 179/02* (2013.01); *C09J 2400/10* (2013.01)

(58) Field of Classification Search
None
See application file for complete search history.

(56) References Cited

FOREIGN PATENT DOCUMENTS

| | | | | |
|---|---|---|---|---|
| CA | 2798740 A1 | * | 12/2011 | ............ B82Y 30/00 |
| JP | 2004513216 A | * | 4/2004 | |

OTHER PUBLICATIONS

JP2004513216A Googe Patents translation (Year: 2022).*

* cited by examiner

*Primary Examiner* — Eric W Golightly
(74) *Attorney, Agent, or Firm* — Naval Air Warfare Center Weapons Division; Stuart H. Nissim

(57) ABSTRACT

A molecular adhesive system for reversibly joining two surfaces, comprising: an anionic coating on a first of two surfaces to be joined; a conductive polymer nanotube array on a second of the two surfaces to be joined; wherein said conductive polymer nanotube array is functionalized with metal nanoparticles; and an electric potential applied across said two surfaces.

7 Claims, 3 Drawing Sheets

Reverse potential to reduce $Fe^{+2}$ to $Fe^0$ to release PAA-Paint from CPA, repeat process.

ELECTROSTATICALLY-ASSISTED TWO-STEP CONDUCTIVE POLYMER APPLIQUE (CPA) PAINT REMOVAL PROCESS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

Coatings used on ships, combat vehicles, and structures perform a variety of functions including protection from moisture, heat, salt spray and other chemicals. For the Air Force and Marines, fresh coatings are applied to change camouflage patterns or to change insignias. Additionally, new coatings are applied to spruce up the aircraft or ship before an inspection or an open house. These coatings must be removed from the metal in sections, to allow detail work to the metal surface rework or repair operations, and to keep weight down to acceptable levels. Over the past fifteen years, numerous efforts have been investigated to reduce the hazardous waste generated by various paint removal systems. Highly toxic materials such as phenols, methylene chloride, benzyl alcohol, chemical immersion, plastic media blasting and lasers have not proven to be robust enough nor environmentally compliant for paint removal on ships, structures, and military vehicles. In order to comply with existing environmental regulations and to effectively remove paint formulations from various substrates, novel approaches to paint stripping are being investigated.

Over the past decade, there has been considerable effort in producing zero-VOC coatings for use on exterior aircraft surfaces. Appliques are manufactured films of fluoropolymer with a pressure-sensitive adhesive to bond to aircraft surfaces. Such materials have been developed by 3M Corporation and units of the BOEING Company to replace paint with a laminate film (applique) that is easily applied and removed (peel-and-stick), waterproof and weighs less than accumulated coats of paint.

Looking to nature for safer adhesives, geckos in particular, have developed the most complex adhesion system in their foot pads. Grayish, N., Wilkinson, M., and Autumn, K., Frictional and elastic energy in gecko adhesive detachment, J. R. Soc. Interfac, 5, 339 (2008). They have an adhesion architecture which allows them the ability to adhere and detach from different smooth and rough surfaces at will. The peeling-off mechanism (or detachment from the surface) of the gecko requires reorientation of the spatulae. This hierarchical structure gives the gecko the unique ability to create large real area contact with rough surfaces. This adhesion action is termed "smart adhesion". Weak van der. Waals (primary adhesion forces) and capillary forces (secondary forces) are the forces needed to adhere to various surfaces by the gecko. Autumn, K., Sitti, M., Liang, Y. A., Peattie, A. M., Hansen, W. R., Sponberg, S., Kenny, T. W., Fearing, R., Israelachvili, N. J. and Full. *Evidence for van der Waals adhesion in gecko setae*, R. J., Proc. Natl. Acad. Sci., USA, 99, 12252 (2002).

In order to realize the potential for a simple, non-VOC paint removal system, the adhesion/mechanical properties of a synthetic gecko's foot would have to be modified. The finely structured contact elements that would be required to deliver sufficient adhesive force to remove a paint formulation from a metal substrate would be significant.

The current invention provides sufficient adhesion forces, utilizing electrostatically enhanced, biomimetic adhesion of two surfaces using nanostructures inspired by geckos' setae. The new materials do not only utilize van der Waals forces for their adhesive properties; they also take advantage of the chemical interaction of anions on a first surface with metal nanoparticles on a second surface.

Figure 1:
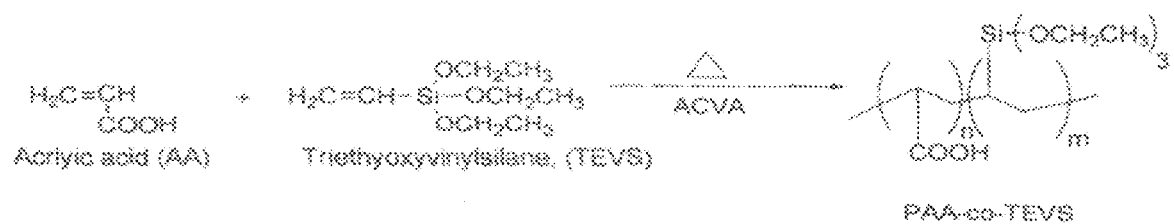
FIG. 1 is an illustration of the chemical formula of the preparation of PAA-co-TEVS polymers, according to embodiments of the invention.
Figure 2:
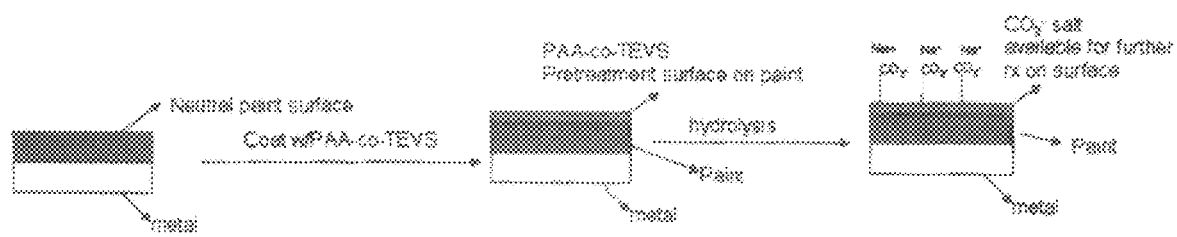
FIG. 2 is an illustration of the process of coating a surface with PAA-co-TEVS polymers, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Preferred embodiments of the present invention generally relate to the synthesis, preparation, and use of a low cost, environmentally benign, electrostatically enhanced biomimetic adhesive system. This system is useful for protective coatings, removable protective coatings and in an environmentally safe paint and applique removal process.

The present invention addresses the limitations of current paint strippers with a more robust technology; eliminating media and hazardous waste by-products. A combination of nature's adhesive properties (e.g. gecko) with the adhesion properties of appliques provides a low cost, environmentally benign adhesive system useful, for example, as a paint removal system.

Benefits of this present invention include, for example: 1) providing zero-VOC and zero-hazardous air pollutants (HAPs) paint and applique removal, 2) enabling multiple coating removals from a variety of metal substrates, and 3) delivering an easily applied, cost-effective, and re-useable system for paint and applique removal.

Although embodiments of the invention are described in considerable detail, including references to certain versions thereof, other versions are possible. Therefore, the spirit and scope of the appended claims should not be limited to the description of versions included herein.

Where a range of values is provided, it is understood that each intervening value, to the tenth of the unit of the lower limit unless the context clearly disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

In one embodiment of the adhesive system of the present invention, the system is used as an adhesive to bond two surfaces. The system comprises a first film or coating which provides a plurality of anionic moieties on a first surface to be bonded. A second film or coating on a second surface to be bonded provides a plurality of metal nanoparticles on the second surface. In examples, the surface to be bonded could be the film or coating itself. The plurality of both the anionic moieties and the metal nanoparticles is a relative number, sufficient to provide the adhesion required to bond said 2 surfaces together with the desired strength. In preferred examples, the plurality of anionic moieties and the plurality of metal nanoparticles necessary for the surfaces to be bonded requires complete coverage of both surfaces, more preferably complete charge coverage. The area of the surface is preferably covered with the same amount, for example, mole %, grams, charge density, density of mass of the anionic moieties and metal nanoparticles.

When the 2 surfaces are placed into contact, the anionic moieties and the metal nanoparticles form ionic bonds, resulting in adhering the two surfaces together. A further enhanced bond is formed when electrical potential applied across the two adhering coatings/surfaces alters the oxidation state of the metal nanoparticles, facilitating the desired ionic bonding; and, when the opposite potential is applied, allowing for the easy separation of the two surfaces.

The first surface to be bound has on its surface a plurality of anions. These anions may be inherent to the surface to be bonded or may require the application of a pretreatment film. Examples of such anions include, but are not limited to, $CO_2^-$, $OH^-$, tetrafluoroborate, hexafluorophosphate, trifluoromethanesulfonate, perchlorate, sulfate, chloride, bromide, and nitrate. These anions can be present in the form of, for example, tetrafluoroborate, hexafluorophosphate, trifluoromethanesulfonate, perchlorate, sulfate, chloride, bromide, nitrate, or functionalized polymers including, but not limited to, polyesters, polyethers, polyvinyl, polyalcohols, poly amides, polyoelfins, polyaromatics, polyacids, polysilanes, polysiloxanes, polyacrylic acid, polystyrene sulfonic acid, polymethacrylic acid, poly phosphonic acids, and the like.

In examples, incorporating a first surface comprising painted metal, preferred polyanionic coatings bind to the painted surface with enough strength to be stronger than the bond of the paint to the metal surface underneath. The adhesion of paints onto a metal surface is the summation of all interfacial and intermolecular forces. These forces include chemical, mechanical, electrostatic and acid-base adhesion phenomena and their combinations. Chemisorption (covalent and co-ordination bonds) interactions are the predominant mechanism by which paint/polymer systems adhere to metals. Many other types of adhesive forces such as hydrogen bonding, van der Waals, electrostatic are also contributing to the paint-metal adhesion.

One preferred example of bonding of the two surfaces incorporates the preparation of a PAA (polyanionic applique) pretreatment polyanionic coating on a first surface and a layer of CPA (conductive polymer applique) nanotube arrays on a second surface.

In order to overcome the strong intra- and inter-molecular attractions between the paint and (metal) substrate, a stronger bond between the Conductive Polymer Applique (CPA) and the paint must be realized. Ionic or electrostatic bonds have the highest bond energies as compared to other types. The following table (see Table 1) summarizes the forces at the interface or within the bulk of a material.

TABLE 1

Typical forces at the interface or within the bulk of a material

| Type of Force | Source of Force | Bond energy (KJ/mol) | Description |
| --- | --- | --- | --- |
| Primary | Covalent | 60-700 | Diamond or cross-linked polymers |
| Primary | Ionic or Electrostatic | 600-1000 | Crystals |
| Primary | Metallic | 100-350 | Forces in welded joints |
| Secondary (van der Waals) | Dispersion | 0.1-40 | Temporary dipoles |
| Secondary (van der Waals) | Polar | 4-20 | Permanent dipoles |
| Secondary (van der Waals) | Hydrogen Bonding | Up to 40 | Sharing of protons between two atoms possessing loan pairs of electrons |

A coating layer comprising conductive polymer (CP) nanotube arrays is provided on the second surface. This second surface can be used, for example, as a pulling layer to remove paint/appliques from the first surface. Conductive polymer nanotubes, preferably based on aniline monomers, pyrrole monomers, thiophene monomers, or combinations thereof can be utilized due to their unique properties including ease of fabrication, synthetic tenability, flexibility and high mechanical properties including high strength and the ability survive high mechanical strains and stresses. The CP nanotube arrays are functionalized with anionic groups (e.g. carboxylic, sulfonic, and phosphonic groups) for subsequent ionic attachment of metal nanoparticles, preferably ferrous metals. Preferably, a template-free method is used to fabricate the CP nanotube arrays.

Polyanionic Coating

Example polyanionic coatings include single layer coatings or multiple layer coatings. Embodiments of multiple layer coatings may be comprised of a first layer for binding to the paint, bound to a second layer containing anions.

In one embodiment, a pretreatment polyanionic coating (PAA-co-TEVS) is prepared via co-polymerization of acrylic acid, polystyrene sulfonic acid, polymethacrylic acid, polystyrene phosphonic acid, for example, with triethyoxyvinylsilane (TEVS) (as an adhesion promoter) using thermal initiators (e.g. 4,4'-azobis(4-cyanovaleric acid, ACVA), AIBN, benzoyl peroxide, and the like. See FIG. 1, where n and m are each independently up to about 10,000.

The PAA-co-TEVS is coated onto the first surface to be bonded via, for example, spraying, dipping, brushing, doctor blading, or the like. After it is deposited in its neutral form the PAA-co-TEVS will have an extended conformation with COOH groups on the surface of the film available for subsequent hydrolysis to the CO2- salt; which will allow for either ionic or electrostatic bonding for the CPA and the second surface. This PAA-co-TEVS layer is then hydrolyzed via treatment with aqueous acid or base, preferably an aqueous solution of any acid or base that is about 0.1 molar. Examples include, dilute acid solutions of hydrochloric acid, sulfuric acid, nitric acid, acetic acid (0.1-5.0M solutions only) and sodium hydroxide, potassium hydroxide (0.1-5.0M) solutions only, these aqueous acid or base solutions must be low molarity. The hydrolyzed PAA film will serve as the anionic pretreatment layer for later attachment to the second surface—with the CPA nanotubes array.

Conductive Polymer Applique (CPA)

Figure 3:
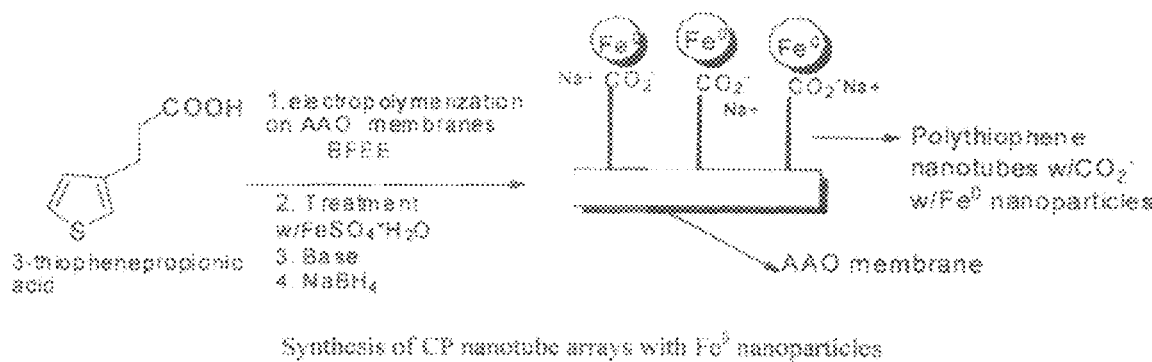
FIG. 3 is an illustration of the synthesis of conductive polymer nanotube arrays with $Fe^0$ nanoparticles, according to embodiments of the invention.
Figure 4A:
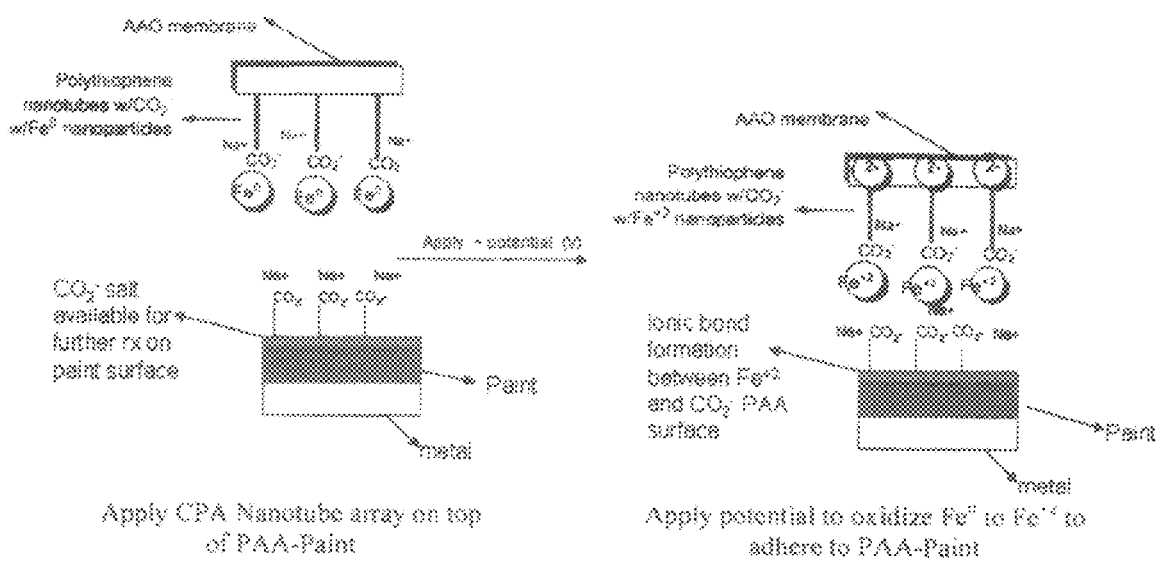
FIG. 4a is an illustration of the process of applying a nanotube array to a PAA layer, according to embodiments of the invention.
Figure 4B:
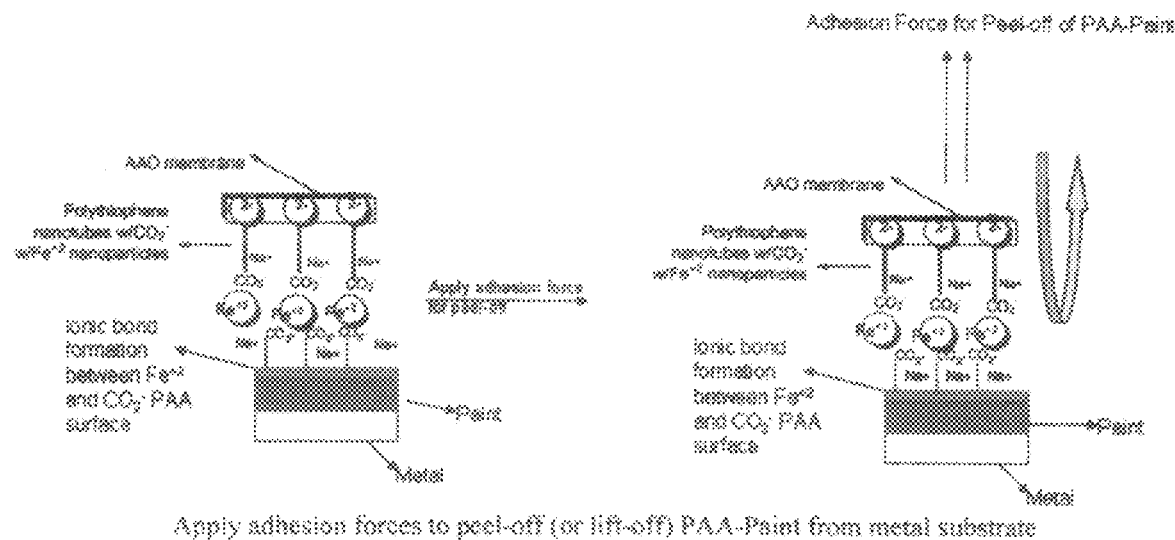
FIG. 4b is an illustration of the process of applying adhesion forces to peel off a PAA paint layer from a metal substrate, according to embodiments of the invention.
Figure 4C:
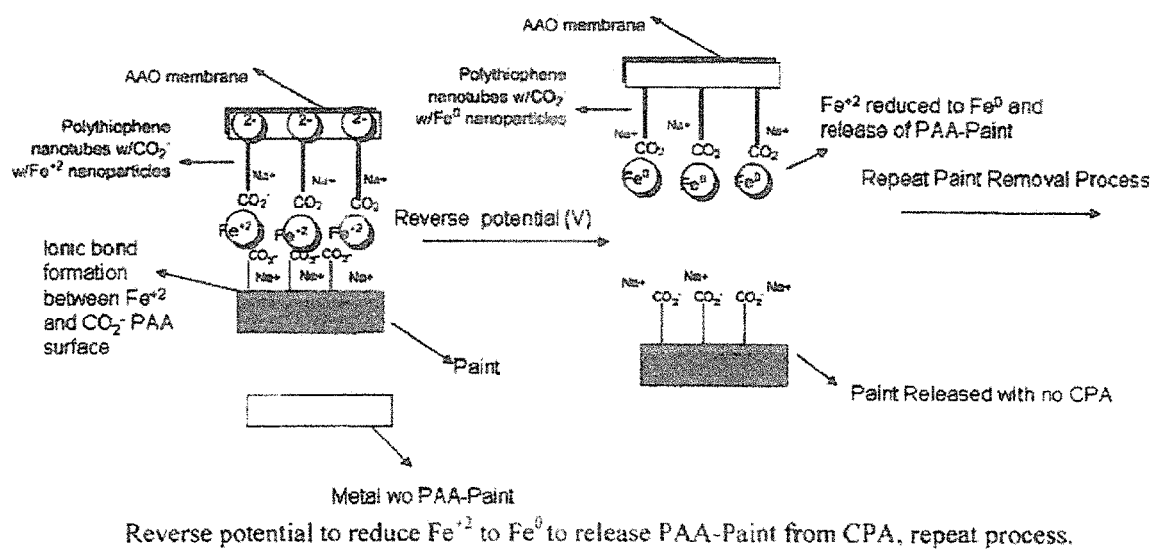
FIG. 4c is an illustration of the process of reversing potential to release a PAA-paint layer from a CPA layer, according to embodiments of the invention.

As illustrated in FIG. 3, preferred CP nanotube arrays are fabricated by polymerizing the monomers on a substrate. Suitable substrates include, but are not limited to, metal alloys such as aluminum alloys: 2024-T3, 7075-T6, 6061, 5083; ferrous alloys such as carbon steels: 1008, 1010; high strength steels: 4130, 4340; and cold rolled steel. In one example embodiment, a 3-thiophenepropionic acid monomer is electro polymerized on an Anodic Aluminum Oxide (AAO) membrane using boron fluoride-ethyl ether (BFEE) as a solvent. The CP nanotube polymer is then purified to remove any carbon-based materials that don't have the desired properties, for example, carbonaceous/graphitic impurities or impurities that don't have the same shape as the nanotubes.

A preferred purification process comprises stirring the CP nanotube polymer for long, slow oxidation in an $H_2O_7$ solution assisted by ultrasonication at room temperature combined with a short acid treatment. Purified CP nanotube polymers were obtained by stirring in 30 wt. % $H_2O_2$ solution at room temperature for 7 days followed by HCl treatment.

After purification of the CP nanotube polymer, attachment of metal nanoparticles to the CP nanotube arrays is accomplished, for example, via a liquid-phase reaction utilizing sodium borohydride ($NaBH_4$) as the reducing agent.

Of the preferred ferrous metals, one preferred metal nanoparticle is iron, $Fe^0$. The preparation of the $Fe^0$ nanoparticles under ambient atmosphere will result in a thin film of iron oxide (~1-2 nm) on the surface of the nanoparticles. This thin iron oxide layer will provide sites for ionic bond formation between the iron oxide surface and the anionic groups (e.g., $CO_2^-$) on the CPA nanotube arrays. A preferred procedure for preparing the $Fe^0$ nanoparticles (10-30 nm) involves agitation of $FeSO_4 \cdot H_2O$ and the CP nanotube arrays in deionized water. This is followed by adjusting the pH to be slightly basic with sodium hydroxide and reducing the $Fe^{2+}$ and $Fe^{3+}$ salts on the CP nanotube arrays to $Fe^0$ using a reducing agent, for example, sodium borohydride ($NaBH_4$). $NaBH_4$ is a very mild reducing agent and will not reduce the carbonyl functional groups on the CP nanotube arrays. An illustration of this process is shown in FIG. 3.

Paint Removal

Referencing FIGS. 2 and 4a-4e, when used as a paint removal system, the CPA nanotube arrays film will be placed in direct contact with the PAA pretreated paint layer. For additional adhesion of the CPA to the PAA pretreatment an electrical potential is applied across the films to oxidize the $Fe^0$ nanoparticles to $Fe^{+2}$ with concurrent reduction of the AAO membrane to maintain charge balance. In one example, the structural surface under the paint functions as a first electrode, the other electrode would be separately applied to the layer with the iron nanoparticles. The oxidized $Fe^{+2}$ ions will adhere very strongly through ionic bond formation to the PAA pretreatment film (via the anionic groups). Once the ionic bond is formed, removal of the coating via shear adhesive forces is required to peel-off the CPA/PAA-adhered paint. When the potential is reversed, the $Fe^{+2}$ nanoparticles on the CPA film will be reduced to $Fe^0$ allowing for the CPA/PAA-adhered paint to fall-off the CPA applique which can then be used again to remove more (PAA treated) paint—which represents a unique paint removal process which is non-toxic, reversible, and reusable.

EXAMPLES

Example 1

Electrolytically assisted paint removal from a metal substrate has been shown to effectively de-bond paint from a metal surface. A metal substrate was made cathodic in an electrolyte solution (pH=6-8) and an anode was added to complete the cell. Electric current was applied to the electrolytic cell (40-140 mA/cm2) for 5-60 minutes. De-bonding of the paint was demonstrated in plating tanks that can hold electrolyte solutions.

Example 2

A similar approach that is more robust which can remove paint from a variety of substrates and shapes can be achieved with the current invention. A polyanionic pretreatment (PAA) is directly attached to the paint on a first surface. Fabrication of the CPA nanotube arrays is via a hard template. The hard template used for the fabrication process is a porous anodic aluminum oxide (AAO) membrane. The CPA nanotube arrays containing. $Fe^0$ nanoparticles can undergo redox chemistry which assures the formation of an ionic bond between the two layers. The formation of this ionic bond is accomplished via electrostatic control. An applied potential oxidizes the $Fe^0$ to $Fe^{+2}$ with subsequent reduction of the AAO membrane to insure charge balance. Once the $Fe^0$ is oxidized to $Fe^{+2}$ a strong ionic bond between the CPA nanotube arrays and PAA pretreated paint will allow easy peel-off by separating, the two surfaces. The oxidized $Fe^{+2}$ can be reduced back to $Fe^0$ via a reverse potential allowing the removed paint to essentially fall-off the appliqué (CPA).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A molecular adhesive system for reversibly joining two surfaces, comprising:
    an anionic coating on a first of two surfaces to be joined;
    a conductive polymer nanotube array on a second of the two surfaces to be joined;
        wherein said conductive polymer nanotube array is functionalized with metal nanoparticles; and
    an electric potential applied across said two surfaces.

2. The molecular adhesive system of claim 1 wherein said conductive polymer nanotube array is functionalized with anionic groups configured to ionically attach said metal nanoparticles.

3. The molecular adhesive system of claim 2 wherein:
    said anionic groups comprise CO2-, OH—, tetrafluoroborate, hexafluorophosphate, trifluoromethanesulfonate, perchlorate, sulfate, chloride, bromide, nitrate, or functionalized polymers.

4. The molecular adhesive system of claim 3 wherein:
said functionalized polymers comprise polyesters, polyethers, polyvinyl, polyalcohols, poly amides, polyoelfins, polyaromatics, polyacids, polysilanes, polysiloxanes, polyacrylic acid, polystyrene sulfonic acid, polymethacrylic acid, or poly phosphonic acids.
5. The molecular adhesive system of claim 1 wherein:
said anionic coating comprises a co-polymer of acrylic acid with triethyoxyvinylsilane (TEVS).
6. The molecular adhesive system of claim 1 wherein:
said conductive polymer nanotubes are comprised of aniline monomers, pyrrole monomers, thiophene monomers or combinations thereof.
7. The molecular adhesive system of claim 1 wherein:
said metal nanoparticles comprise iron nanoparticles.

* * * * *